US008427550B2

(12) United States Patent
Ogasahara et al.

(10) Patent No.: US 8,427,550 B2
(45) Date of Patent: Apr. 23, 2013

(54) IMAGE PROCESSING DEVICE CORRECTING IMAGE DATA, IMAGE SENSOR AND IMAGE PROCESSING METHOD

(75) Inventors: Takayuki Ogasahara, Yokahama (JP); Akira Nakao, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 426 days.

(21) Appl. No.: 12/539,033

(22) Filed: Aug. 11, 2009

(65) Prior Publication Data
US 2010/0039528 A1 Feb. 18, 2010

(30) Foreign Application Priority Data
Aug. 12, 2008 (JP) .................................. 2008-207962

(51) Int. Cl.
 *H04N 9/73* (2006.01)
(52) U.S. Cl.
 USPC ........................................................ 348/223.1
(58) Field of Classification Search ............... 348/223.1, 348/655
 See application file for complete search history.

(56) References Cited

U.S. PATENT DOCUMENTS

2008/0278592 A1* 11/2008 Kuno et al. ................ 348/222.1

FOREIGN PATENT DOCUMENTS

| JP | 2003-230052 | 8/2003 |
|---|---|---|
| JP | 2004-40544 | 2/2004 |
| JP | 2004-72758 | 3/2004 |
| JP | 2004-235851 | 8/2004 |
| JP | 2005-210526 | 8/2005 |
| JP | 2007-36462 | 2/2007 |

OTHER PUBLICATIONS

Office Action issued Jan. 4, 2011 in Japanese Patent Application No. 2008-207962 (with English translation).

* cited by examiner

*Primary Examiner* — Roberto Velez
*Assistant Examiner* — Stephen Coleman
(74) *Attorney, Agent, or Firm* — Oblon, Spivak, McClelland, Maier & Neustadt, L.L.P.

(57) ABSTRACT

An image processing device of an example of the invention comprises a section which acquires a gain value obtained by an automatic white balance process executed on image data to be processed, a section which, based on the gain value, determines a correction color matrix coefficient having a property of correcting a change in an appearance caused by a color temperature corresponding to the gain value, and a section which, based on the correction color matrix coefficient, performs a color adjustment on the image data obtained by the automatic white balance process.

15 Claims, 5 Drawing Sheets

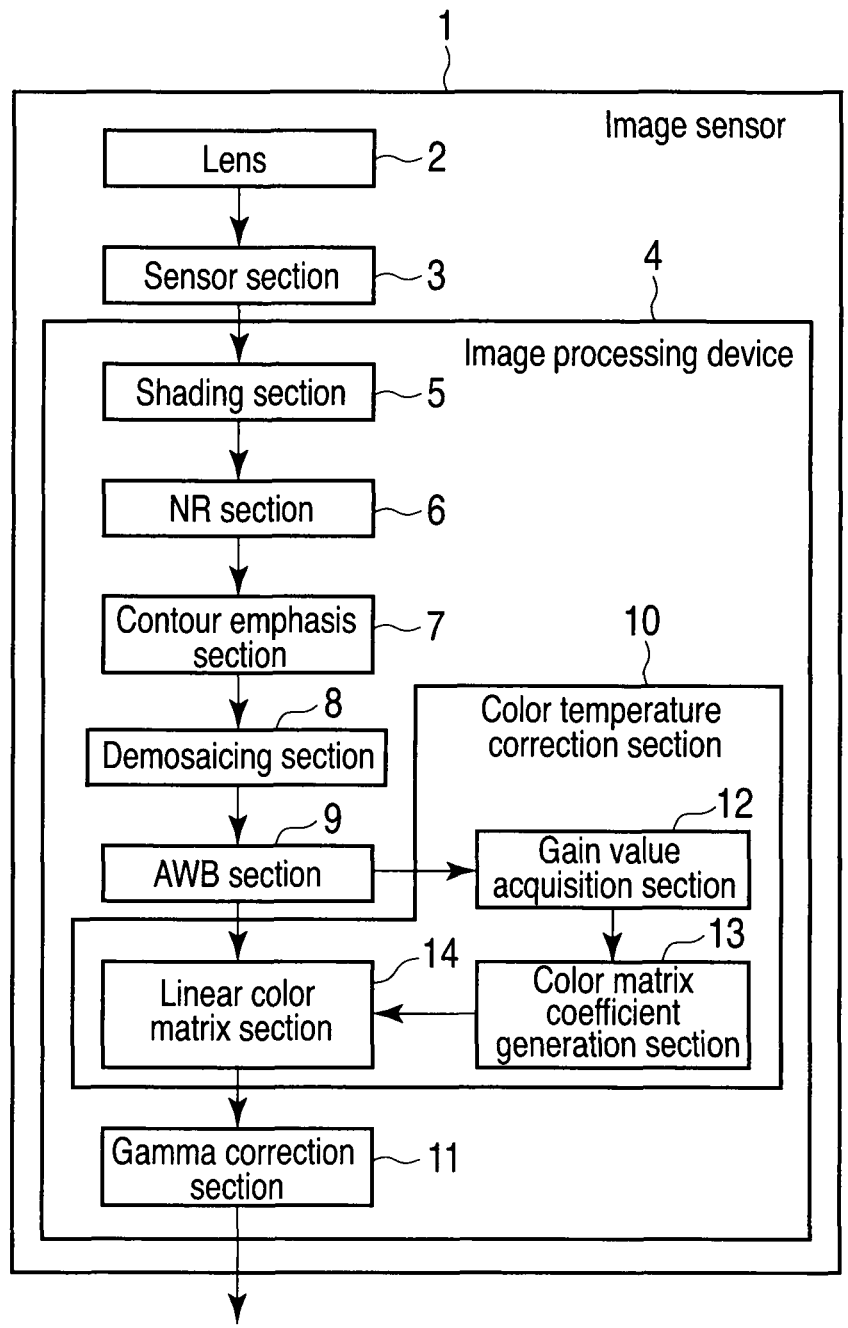
F I G. 1

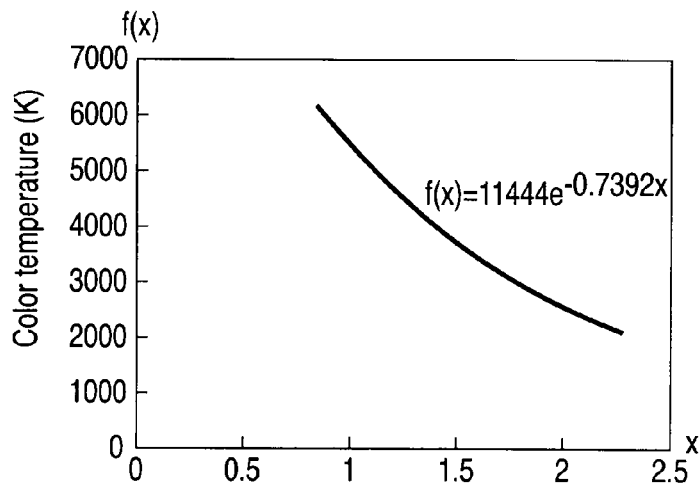

FIG. 5

$$\begin{cases} \begin{vmatrix} R \\ G \\ B \end{vmatrix} = \begin{vmatrix} a_{11} & a_{12} & a_{13} \\ a_{21} & a_{22} & a_{23} \\ a_{31} & a_{32} & a_{33} \end{vmatrix} \cdot \begin{vmatrix} R_0 \\ G_0 \\ B_0 \end{vmatrix} \\ R_0, G_0, B_0 : \text{Device-dependent RGB} \\ R, G, B : \text{Device-independent RGB} \\ a_{ij} : \text{Coefficient of Color Matrix} \end{cases}$$

FIG. 6

$$\left.\begin{matrix} \begin{vmatrix} a_{11} & a_{12} & a_{13} \\ a_{21} & a_{22} & a_{23} \\ a_{31} & a_{32} & a_{33} \end{vmatrix} = \begin{vmatrix} 1-(a_{12}+a_{13}) & a_{12} & a_{13} \\ a_{21} & 1-(a_{21}+a_{23}) & a_{23} \\ a_{31} & a_{32} & 1-(a_{31}+a_{32}) \end{vmatrix} \\ = \begin{vmatrix} \boxed{A_{11}} & \boxed{A_{12}} & A_{13} \\ A_{21} & A_{22} & A_{23} \\ \boxed{A_{31}} & \boxed{A_{32}} & A_{33} \end{vmatrix} \end{matrix}\right\} \begin{matrix} \text{General color} \\ \text{matrix coefficients} \end{matrix}$$

$$\Downarrow$$

$$\left.\begin{vmatrix} g_{11}(B/R) \cdot A_{11} & g_{12}(B/R) \cdot A_{12} & A_{13} \\ A_{21} & A_{22} & A_{23} \\ g_{31}(B/R) \cdot A_{31} & g_{32}(B/R) \cdot A_{32} & A_{33} \end{vmatrix}\right\} \begin{matrix} \text{Correction color} \\ \text{matrix coefficients} \end{matrix}$$

$g_{ij}(B/R)$ : Weighted Coefficient considering gain value

FIG. 7

IMAGE PROCESSING DEVICE CORRECTING IMAGE DATA, IMAGE SENSOR AND IMAGE PROCESSING METHOD

CROSS-REFERENCE TO RELATED APPLICATIONS

This application is based upon and claims the benefit of priority from prior Japanese Patent Application No. 2008-207962, filed Aug. 12, 2008, the entire contents of which are incorporated herein by reference.

BACKGROUND OF THE INVENTION

1. Field of the Invention

The present invention relates to an image processing device correcting image data, an image sensor, and an image processing method.

2. Description of the Related Art

Color processing is conventionally optimized using a standard light source (a light source such as D65 which has a relatively flat spectral distribution).

As a result, in image data obtained, a place under an incandescent lamp or the like which exhibits a low color temperature tends to be yellowish. A place under a fluorescent lamp or the like which exhibits a high color temperature tends to be bluish.

Document 1 (Jpn. Pat. Appln. KOKAI Publication No. 2004-72758) discloses a color processing device that converts an input image into an image signal to allowing the image signal to be visualized.

The color processing device in the document 1 recognizes a set condition for a peripheral portion in a region where the input image is displayed, and predicts, according to the recognized set condition, a change in an appearance of a color by a condition of the peripheral region in the input image. The color processing device thus determines a color conversion coefficient and executes a color conversion process on the input image based on the determined color conversion coefficient.

However, in the document 1, a correction for image data affected by a color temperature is not executed. Thus, in the document 1, a correction to a difference between one appearance of one color and another appearance of another color caused by a difference between one color temperature and another color temperature is not executed for the image data to be processed.

BRIEF SUMMARY OF THE INVENTION

An image processing device of a first example of the invention comprises: a gain value acquisition section which acquires a gain value obtained by an automatic white balance process executed on image data to be processed; a color matrix coefficient generation section which, based on the gain value acquired by the gain value acquisition section, determines a correction color matrix coefficient having a property of correcting a change in an appearance caused by a color temperature corresponding to the gain value; and a color matrix section which, based on the correction color matrix coefficient, performs a color adjustment on the image data obtained by the automatic white balance process.

An image sensor of a second example of the invention comprises: a lens which focuses incident light; a sensor which photoelectrically converts the light obtained via the lens and observes a signal for a first color, a signal for a second color, and a signal for a third color; a demosaicing section which executes a demosaicing process based on the signal for the first color, the signal for the second color, and the signal for the third color to generate a color image signal; a gain value acquisition section which acquires a gain value obtained by an automatic white balance process executed on the color image signal; a color matrix coefficient generation section which, based on the gain value acquired by the gain acquisition section, determines a correction color matrix coefficient having a property of correcting a change in an appearance caused by a color temperature; and a color matrix section which, based on the correction color matrix coefficient, performs a color adjustment on the color image signal obtained by the automatic white balance process.

An image processing method of a third example of the invention comprises: acquiring a gain value obtained by an automatic white balance process executed on image data to be processed; determining a correction color matrix coefficient having a property of correcting a change in an appearance caused by a color temperature corresponding to the gain value based on the gain value; and performing a color adjustment on the image data obtained by the automatic white balance process based on the correction color matrix coefficient.

BRIEF DESCRIPTION OF THE SEVERAL VIEWS OF THE DRAWING

FIG. 1 a block diagram showing an example of an image sensor according to a first embodiment of the invention;

FIG. 5 is a graph showing an example of a relationship between a ratio B/R of a B gain value to a R gain value and a color temperature;

FIG. 6 shows an example of a correction expression based on general color matrix coefficients;

FIG. 7 is a diagram showing an example of correction color matrix coefficients;

DETAILED DESCRIPTION OF THE INVENTION

Figure 2:
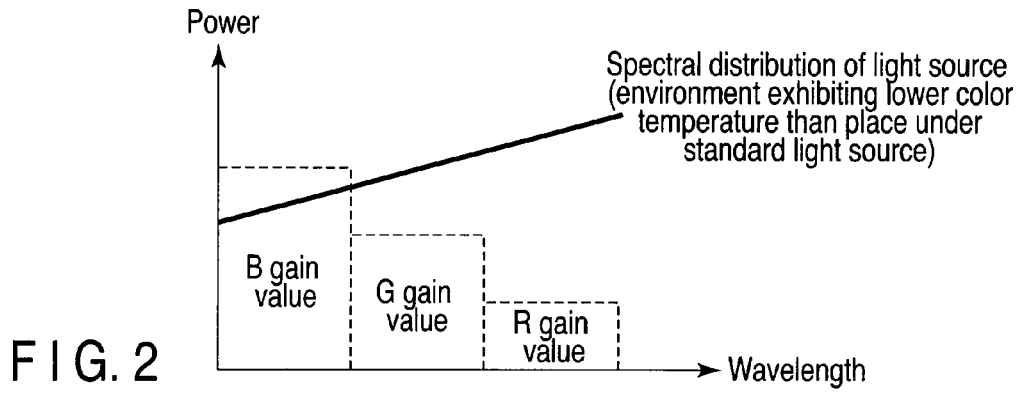
FIG. 2 is a graph showing an example of a spectral distribution and gain values of a light source in an environment having a lower color temperature than a color temperature under a standard light source.

Embodiments of the present invention will be described below with reference to the drawings. In the description below, substantially the same functions and components are denoted by the same reference numbers. Duplicate descriptions will be given only when required.

First Embodiment

The present embodiment estimates a color temperature in real time and feeds back an estimation result to color processing in real time to correct a difference between one appearance of one color and another appearance of another color caused by a difference between one color temperature and another color temperature.

FIG. 1 is a block diagram showing an example of an image sensor according to the present embodiment.

An image sensor 1 includes a lens 2, a sensor section 3, and an image processing device 4. FIG. 1 shows a configuration in which the image sensor 1 includes the image processing device 4 by way of example. However, the image processing device 4 may be separated from the image sensor 1. A part of the components of the image processing device 4 may be separated from the image sensor 1.

The image processing device 4 includes a shading section 5, a noise reduction (NR) section 6, a contour emphasis (highlighting) section 7, a demosaicing section 8, an automatic white balance (AWB) section 9, a color temperature correction section 10, and a gamma correction section 11.

In the present embodiment, the color temperature correction section 10 includes a gain value acquisition section 12, a color matrix coefficient generation section 13, and a linear color matrix section 14. The color temperature correction section 10 corrects image data (image signals) based on gain information obtained by the automatic white balance section 9.

The components of the image sensor 1 may transmit and receive signals or data to and from one another via a storage device. The components will be described below.

The lens 2 focuses incident light.

The sensor section 3 photoelectrically converts light entering the sensor section 3 via the lens 2 into a signal (signal load) to generate image data (image signal).

The shading section 5 provides shading to correct image data for luminance unevenness (lack of uniformity) based on a difference in light quantity between the center and periphery of an optical system of the lens 2.

The noise reduction section 6 performs a noise reduction to remove noise such as fixed pattern noise, dark current noise, or shot noise from the shaded image data.

The contour emphasis section 7 performs contour emphasis processing on the image data obtained by (subjected to) the noise reduction, to recover resolution.

The demosaicing section 8 synthesizes, by demosaicing, the image data obtained by the contour emphasis to obtain color image data.

The automatic white balance section 9 executes an automatic white balance process on the color image data resulting from the synthesis.

Figure 3:
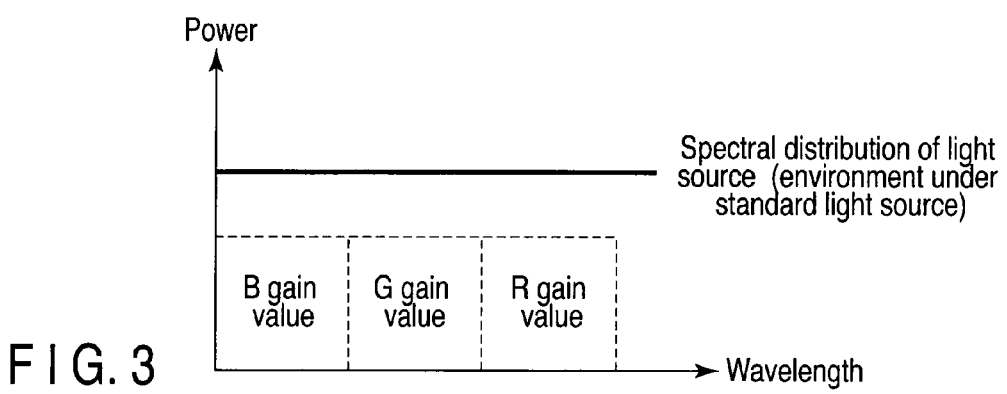
FIG. 3 is a graph showing an example of a spectral distribution and gain values of the light source in an environment under the standard light source.
Figure 4:
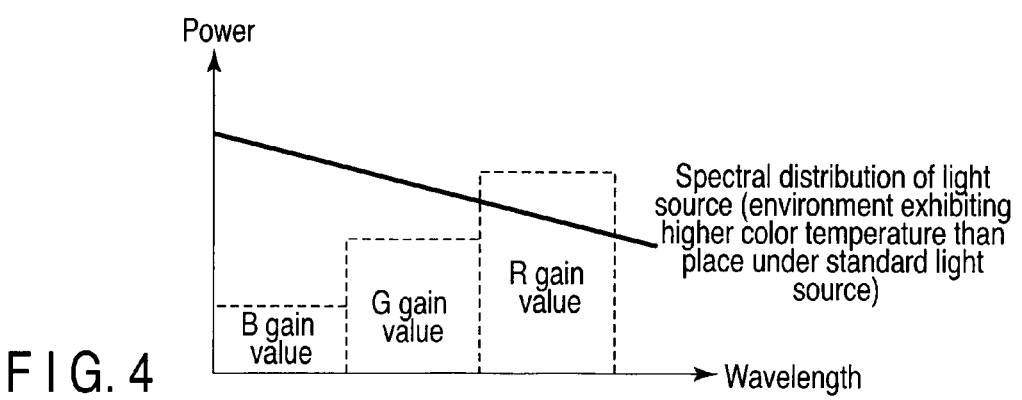
FIG. 4 is a graph showing an example of a spectral distribution and gain values of the light source in an environment having a higher color temperature than a color temperature under the standard light source.

FIG. 2 to FIG. 4 are graphs showing examples of a principle of the automatic white balance process.

The automatic white balance process is a function of adjusting a red (R) gain value, a green (G) gain value, and a blue (B) gain value according to a spectral distribution of a color temperature to make a white portion appear white as shown in FIG. 2 to FIG. 4.

As shown in FIG. 2, in an environment exhibiting a lower color temperature (for example, 3,000 K) than a place under a standard light source, a spectral distribution of the light source is lower on a short wavelength side (blue side) and higher on a long wavelength side (red side). Thus, the automatic white balance process increases the blue gain value and reduces the red gain value, to adjust the blue and red components. That is, in an environment with a low color temperature, the spectral distribution tends to increase from short wavelength to long wavelength. In this case, light on the long wavelength side is amplified more significantly than light on the short wavelength side. Thus, the light on the short wavelength side is insufficient compared to the light on the long wavelength side. Consequently, the red gain value is reduced and the blue gain value is increased to adjust an inclination of the spectral distribution.

As shown in FIG. 3, in an environment under the standard light source where the color temperature is normal and not low or high (the color temperature is, for example, 6,500 K), a spectral distribution is almost equivalent from the short wavelength side to the long wavelength side. Thus, an almost equivalent gain value is set for light of the respective wavelengths.

As shown in FIG. 4, in an environment exhibiting a higher color temperature than the place under the standard light source (the color temperature is, for example, 9,000 K), a spectral distribution of the light source is high on the short wavelength side and low on the long wavelength side. Thus, the automatic white balance process reduces the blue gain value and increases the red gain value, to adjust the blue and red components. That is, in an environment with a high color temperature, the spectral distribution tends to decrease from short wavelength to long wavelength. In this case, light on the short wavelength side is amplified more significantly than light on the long wavelength side. Thus, the light on the long wavelength side is insufficient compared to the light on the short wavelength side. Consequently, the blue gain value is reduced and the red gain value is increased to adjust an inclination of the spectral distribution.

The gain value acquisition section 12 of the color temperature correction section 10 acquires the gain values resulting from the above-described automatic white balance process. In the present embodiment, the gain value acquisition section 12 acquires the blue (B) gain value and the red (R) gain value.

Based on the gain values acquired by the gain value acquisition section 12, the color matrix coefficient generation section 13 determines a correction color matrix coefficient having a property of correcting a change (difference) in an appearance resulting from the color temperature corresponding to the gain values.

Based on the correction color matrix coefficient generated by the color matrix coefficient generation section 13, the linear color matrix section 14 performs a color adjustment on the image data obtained by the automatic white balance process of the automatic white balance section 9.

The gamma correction section 11 performs a gamma correction on the image data corrected by the linear color matrix section 14 to correct luminance and brightness.

The image data generated by the image sensor 1 may be, for example, displayed by a display device, stored in a storage device, or transmitted by a communication device.

A generation process of a correction color matrix by the color matrix coefficient generation section 13 will be described below.

FIG. 5 is a graph showing an example of a relationship between a ratio B/R of a B gain value to a R gain value and a color temperature.

The relationship between the gain value ratio B/R and the color temperature is expressed by a line characterized by showing that the color temperature increases with decreasing gain value ratio B/R and the color temperature decreases with increasing gain value ratio B/R.

The relationship between the gain value ratio B/R and the color temperature is generally expressed by a curve and can be approximated by, for example, an equation $f(x)=B \times e^{-Ax}$.

In the present embodiment, such an approximate curve as shown in FIG. 5 can be used to estimate the color temperature from the gain value (for example, the gain value ratio B/R). The result of the estimation is reflected in a preset color matrix coefficient to generate a correction color matrix coefficient. Reflecting the result of the color temperature estimation in the color matrix coefficient as described above allows the image data outputted by the image sensor 1 to be corrected to a preferred color according to the color temperature.

In the present embodiment, the correction color matrix coefficient is generated by converting a given color matrix coefficient into a correction color matrix coefficient for appropriate correction according to the color temperature. In corrections for color matrix coefficients, the coefficients for red and blue are corrected using functions having gain values (for example, B/R) as a parameter.

FIG. 6 shows an example of a correction expression based on general color matrix coefficients.

Here, R0, G0, and B0 denote device-dependent RGB colors corresponding to uncorrected image data. R, G, and B denote device-independent RGB colors corresponding to corrected image data. The 3×3 matrix is used to convert the device-dependent RGB colors into device-independent RGB colors. "$a_{ij}$" denotes a color matrix coefficient.

FIG. 7 is a diagram showing an example of correction color matrix coefficients. In the matrix operation of converting the device-dependent RGB colors into the device-independent RGB colors, a part or all of the coefficient elements in the matrix used for the matrix operation are converted based on the gain values (for example, the gain value ratio B/R) to generate the correction color matrix.

Specifically, at least one normal color matrix coefficient is multiplied by a function having B/R as a parameter to weigh the at least one color matrix coefficient according to the color temperature that can be estimated from B/R.

In the example in FIG. 7, in the coefficients in the uncorrected 3×3 matrix, a product of a coefficient $A_{11}$ in a first row and a first column and a function $g_{11}$ (B/R) having B/R as a parameter is determined to be a corrected coefficient in the first row and the first column.

A product of a coefficient $A_{12}$ in the first row and a second column and a function $g_{12}$ (B/R) having B/R as a parameter is determined to be a corrected coefficient in the first row and the second column.

A product of a coefficient $A_{31}$ in a third row and the first column and a function $g_{31}$ (B/R) having B/R as a parameter is determined to be a corrected coefficient in the third row and the first column.

A product of a coefficient $A_{32}$ in the third row and the second column and a function $g_{32}$ (B/R) having B/R as a parameter is determined to be a corrected coefficient in the third row and the second column.

In the description of FIGS. 6 and 7, the matrix expression is 3×3. However, the number of columns in the color matrix and the correction color matrix may be at least four.

Figure 8:
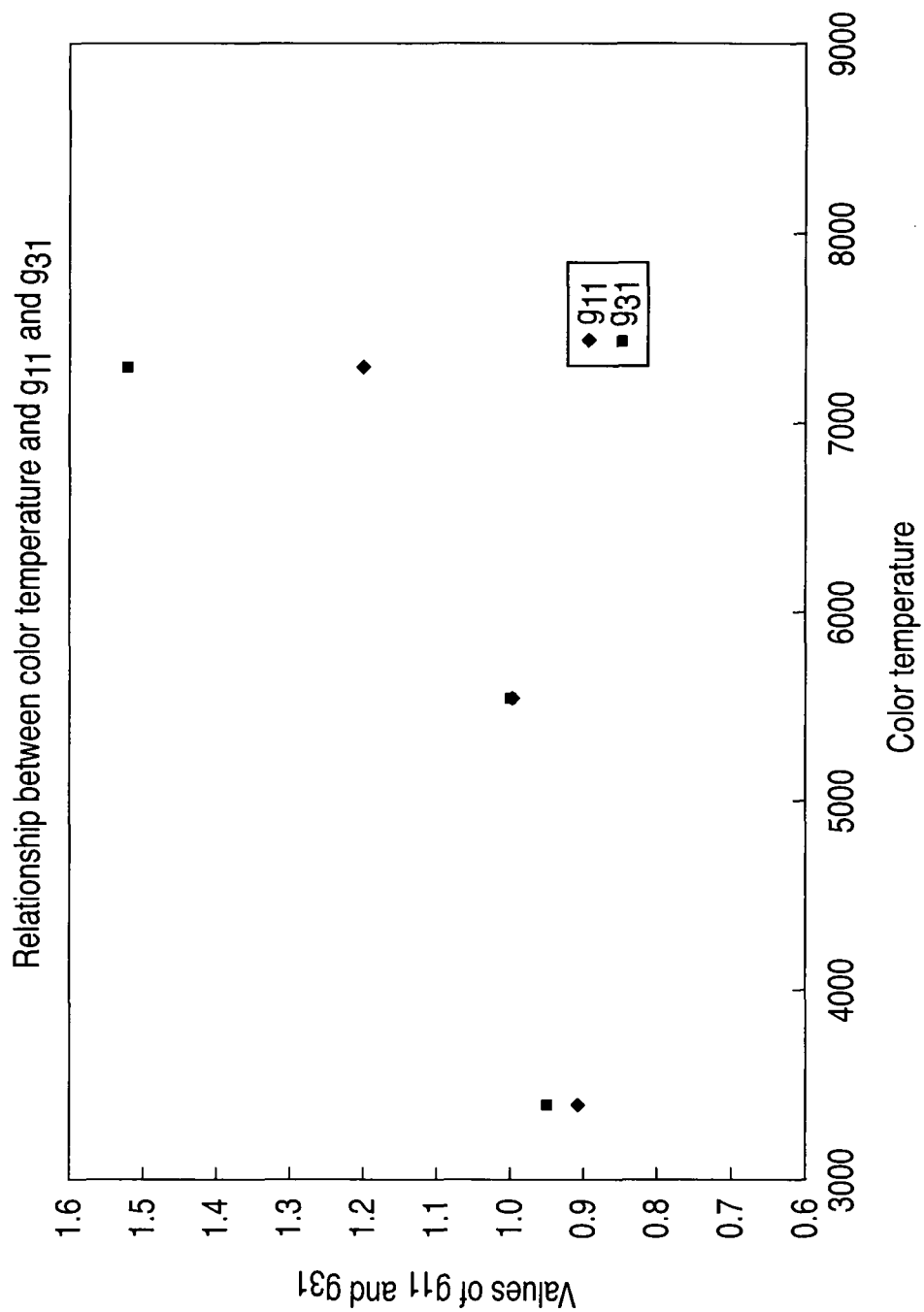
FIG. 8 is a diagram showing an example of a relationship between color temperatures and values of functions g11 and g31 of gain coefficients.

FIG. 8 is a diagram showing an example of a relationship between color temperatures and the gain coefficients g11 and g31 of the color matrix according to the present embodiment.

A high color temperature (a low gain value ratio B/R) requires a gain in R as shown in FIG. 4 described above, resulting in an increase in $g_{11}$. Furthermore, a gain in B is not required, resulting in a decrease in $A_{33}$ and an increase in $g_{31}$.

A low color temperature (a high gain value ratio B/R) does not require the gain in R as shown in FIG. 2 described above, resulting in a decrease in $g_{11}$. Furthermore, a gain in B is required, resulting in an increase in $A_{33}$ and an increase in $g_{31}$. The functions $g_{12}$ and $g_{32}$ are adjustment parameters.

Weights (functions $g_{11}$ [B/R], $g_{12}$ [B/R], $g_{31}$ [B/R], and $g_{32}$ [B/R] having B/R as a parameter) used to determine correction color matrix coefficients are determined, for example, as follows.

First, for each of the ratios B/R of various gain values (that is, for each of the color temperatures), color matrix coefficients for appropriately correction are determined theoretically or through experiments or measurements.

Then, for each of the ratios B/R of various gain values, the functions $g_{11}$ [B/R], $g_{12}$ [B/R], $g_{31}$ [B/R], and $g_{32}$ [B/R] having B/R as a parameter are determined which allow color matrix coefficients to be converted into appropriate color matrix coefficients for each.

Then, the correction color matrix coefficients are determined which include each of the functions $g_{11}$ [B/R], $g_{12}$ [B/R], $g_{31}$ [B/R], and $g_{32}$ [B/R] having B/R.

The above-described present embodiment enables a correction of a difference between the appearance of color under the standard light source and the appearance of the color in the color temperature environment estimated based on the gain value determined by the automatic white balance process.

For image data to be processed, the present embodiment can correct a difference in appearances of colors caused by a difference in color temperatures.

The present embodiment acquires the gain values determined by the automatic white balance process in real time to correct the color matrix based on the gain values in real time.

Thus, compared to a scheme in which a plurality of color matrix coefficients are stored and switched for a plurality of color temperatures, image processing according to the present embodiment gradually changes the color matrix coefficients in conjunction with the color temperature. Thus, the present embodiment can naturally correct a color in real time. Furthermore, the present embodiment need not have a plurality of color matrix for color temperatures. The present embodiment can thus prevent a possible increase in memory capability and in costs.

Moreover, the present embodiment can be used for both still image data and motion picture data.

Second Embodiment

In the above-described first embodiment, the color matrix coefficient is corrected based on the gain value to generate the correction color matrix.

In contrast, the present embodiment first estimates a color temperature based on the gain value, and corrects the color matrix coefficient based on the estimated color temperature to generate a correction color matrix.

Figure 9:
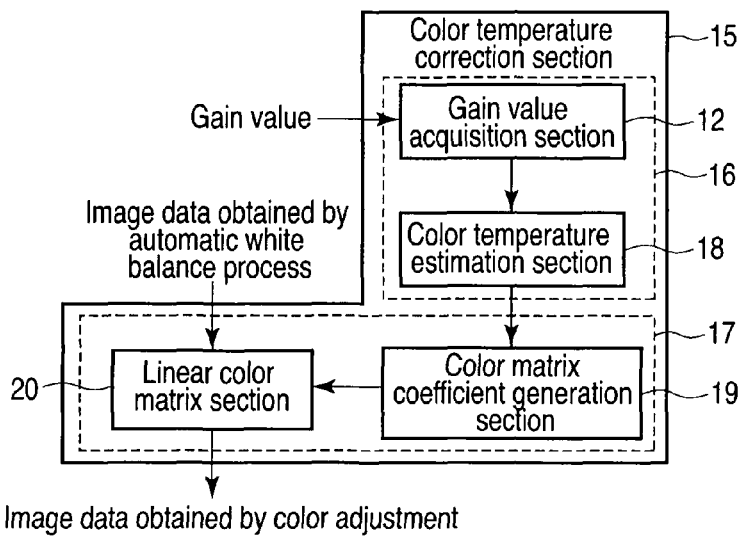
FIG. 9 is a block diagram showing an example of a color temperature correction section according to a second embodiment of the invention.

FIG. 9 is a block diagram showing an example of a color temperature correction section 15 according to the present embodiment.

A color temperature correction section 15 includes an environment light estimation section 16 estimating environment light and a color correction processing section 17 correcting a difference between an appearance of a color under an estimated environment light and the appearance of the color under the standard light source. In the present embodiment, the environment light estimation section 16 and the color correction processing section 17 both execute processing in real time.

The environment light estimation section 16 includes the gain value acquisition section 12 acquiring the gain value resulting from the automatic white balance process and a color temperature estimation section 18 estimating a color temperature based on an acquired gain value.

For example, the color temperature estimation section 18 inputs the gain value obtained by the automatic white balance process, and estimates the color temperature of the environment light based on an approximate expression or a lookup table indicating the relationship between the color temperatures and the ratio B/R of the gain values shown in FIG. 5 described above.

The color correction processing section 17 includes a color matrix coefficient generation section 19 and a linear color matrix section 20. The color correction processing section 17 performs a color correction on an RGB color space based on the color temperature estimated by the environment light estimation section 16.

The color correction processing section 17 according to the present embodiment performs the color correction using the matrix operation of converting the device-dependent RGB colors into the device-independent RGB colors. A part or the whole of the matrix used for the matrix operation is converted based on the estimated color temperature to generate the correction color matrix.

A specific generation of the correction color matrix can be achieved by using the estimated color temperature instead of the gain value ratio B/R according to the first embodiment.

The above-described embodiment can estimate the color temperature in real time based on the gain value and feed back an estimation result of the color temperature to the color processing in real time to correct a difference in the appearances of colors caused by a difference in the color temperatures.

Third Embodiment

In the above-described first or second embodiment, the color matrix coefficient of the color matrix is multiplied by the weighting function having the gain value or the color temperature as a parameter to convert the color matrix coefficient into the correction color matrix coefficient.

However, the present invention is not limited to the technique of multiplying the color matrix coefficient. The correction color matrix coefficient may be determined based on a function expression used to determine the correction color matrix coefficient based on the gain value or the color temperature and the acquired gain value or the estimated color temperature.

Alternatively, the correction color matrix coefficient may be determined based on a lookup table used to determine the correction color matrix coefficient based on the gain value or the color temperature and the acquired gain value or the estimated color temperature.

The lookup table used to determine the correction color matrix coefficient based on the gain value (for example, the gain value ratio B/R) or the color temperature is determined, for example, as follows.

First, for each of the various gain values or color temperatures, a color matrix coefficient for appropriate correction is determined theoretically or through experiments or measurements.

Then, the lookup table is created in which the various gain values or color temperatures are associated with the correction color matrix coefficient, in order to allow conversion into the determined appropriate color matrix coefficient based on each of the various gains or color temperatures.

Fourth Embodiment

In the present embodiment, the image sensor described above in the first to third embodiments will be described further in detail.

Figure 10:
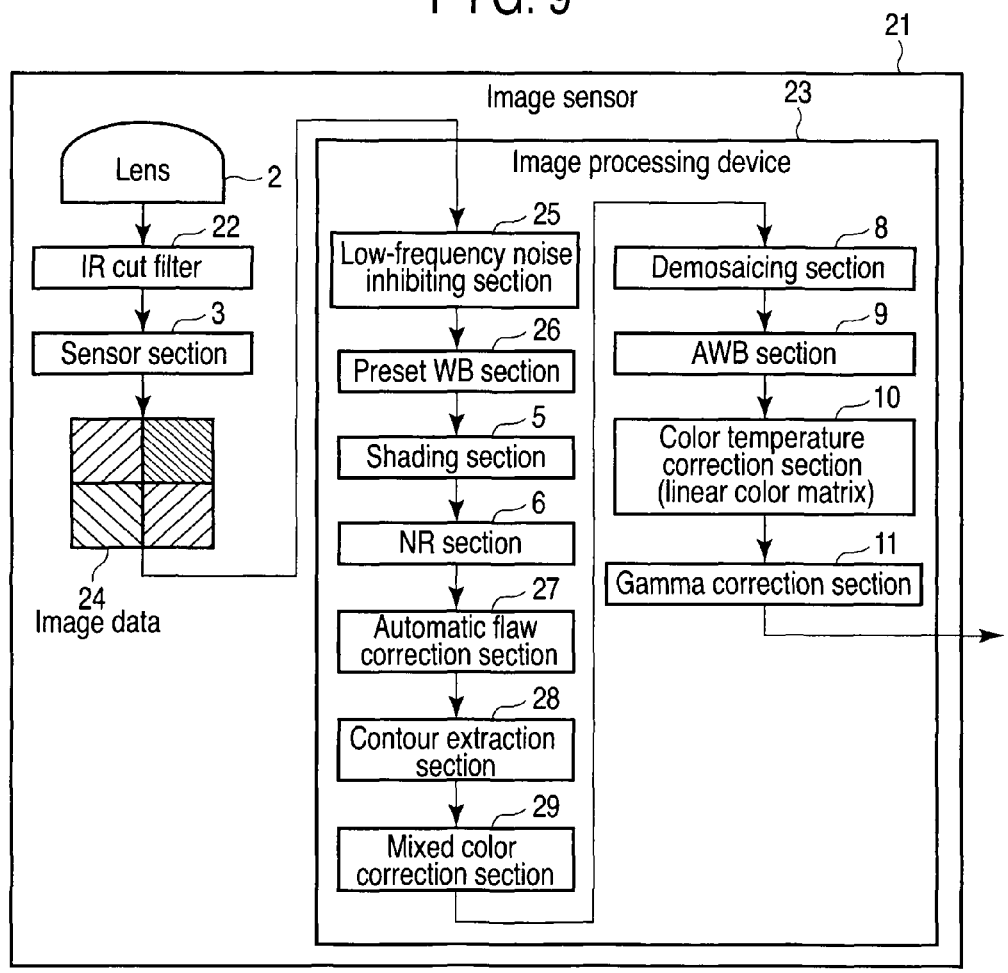
FIG. 10 is a block diagram showing an example of an image sensor according to a fourth embodiment of the invention.

FIG. 10 is a block diagram showing an example of an image sensor according to the present embodiment. FIG. 10 illustrates that an image sensor 21 includes the color temperature correction section 10 according to the above-described first embodiment. However, instead of the color temperature correction section 10, the color temperature correction section according to another embodiment may be provided in the image sensor 21.

The image sensor 21 includes the lens 2, an IR cut filter 22, the sensor section 3, and an image processing device 23.

The sensor section 3 generates image data (an image signal) 24 based on light received via the lens 2 and the IR cut filter 22. The sensor section 3 then outputs the image data 24 to the image processing device 23.

A low-frequency noise inhibiting section 25 of the image processing device 23 executes a low-frequency noise inhibiting process for the image data 24. A preset WB section 26 executes a preset WB process on the image data obtained by the low-frequency noise inhibiting process. The shading section 5 performs a shading correction on the image data obtained by the preset WB process. The noise reduction section 6 executes the noise reduction process on the image data obtained by the shading correction.

An automatic flaw correction section 27 performs a flaw correction on the image data obtained by the noise reduction process. A contour extraction section 28 executes a contour extraction process on the image data obtained by the flaw correction. A mixed color correction section 29 executes a mixed color correction process on the image data obtained by to the contour extraction process.

The subsequent processing from the demosaicing section 8 to the gamma correction section 11 is similar to a corresponding processing in the above-described first embodiment.

In the above-described embodiments, by way of example, the image data comprises RGB data, and the color correction is performed in the RGB color space. However, the image data may comprise YUV data, and the color correction may be performed in a YUV color space. Alternatively, the image may comprises any of LAB, HLS, and IPT data, and the color correction may be performed in the corresponding one of an LAB color space, an HLS color space, and an IPT color space.

In the above-described embodiments, the arrangement of the components may be changed, any of the components may be freely combined together, each of the components may be freely divided, or some of the components may be omitted, provided that in spite of these modifications, operations similar to those described in the above-described embodiments can be performed. That is, the present embodiment is not limited to the as-described configurations. In practice, any of the components may be varied without departing from the spirit of the present invention.

For example, the gain value acquisition section 12 and the color matrix coefficient generation section 13 may be combined together. The gain value acquisition section 12 and the color temperature estimation section may be combined together.

What is claimed is:
1. An image processing device comprising:
 a gain value acquisition section which acquires a gain value obtained by an automatic white balance process executed on image data to be processed;
 a color matrix coefficient generation section which, based on the gain value acquired by the gain value acquisition section, determines a 3×3 matrix including 9 correction color matrix coefficients and having a property of correcting a change in an appearance caused by a color temperature corresponding to the gain value; and a color matrix section which, based on the 9 correction color matrix coefficients, performs a color adjustment on the image data obtained by the automatic white balance process, wherein the color matrix coefficient generation section gradually changes 4 correction color matrix coefficients included in the 3×3 matrix, the image data to be processed is data relating to red, green, and blue, the 4 correction color matrix coefficients comprise a first correction color matrix coefficient and a second correction color matrix coefficient, and the color matrix generation section determines the first correction color matrix coefficient by determining a product of a first function having a ratio of a red gain value to a blue gain value as a parameter of the first function and a preset color coefficient for red, and determines the second correction color matrix coefficient by determining a product of a second function having the ratio as a parameter of the second function and a preset color coefficient for blue.

2. The image processing device according to claim 1, wherein the first and second functions are determined which are required to convert preset color matrix coefficients into predetermined appropriate color matrix coefficients for appropriate correction corresponding to the plurality of gain value ratios.

3. The image processing device according to claim 1, further comprising a color temperature estimation section which estimates a color temperature based on the gain value acquired by the gain acquisition section, and based on the color temperature estimated by the color temperature estimation section, the color matrix coefficient generation section determines the 3×3 matrix having the property of correcting the change in appearance caused by the estimated color temperature.

4. The image processing device according to claim 1, wherein the color matrix coefficient generation section determines the 4 correction color matrix coefficients based on function expressions to determine the 4 correction color matrix coefficients based on gain value parameters and the gain value acquired by the gain value acquisition section.

5. An image sensor comprising:
a lens which focuses incident light;
a sensor which photoelectrically converts the light obtained via the lens and observes a signal for a first color, a signal for a second color, and a signal for a third color;
a demosaicing section which executes a demosaicing process based on the signal for the first color, the signal for the second color, and the signal for the third color to generate a color image signal;
a gain value acquisition section which acquires a gain value obtained by an automatic white balance process executed on the color image signal;
a color matrix coefficient generation section which, based on the gain value acquired by the gain value acquisition section, determines a 3×3 matrix including 9 correction color matrix coefficients and having a property of correcting a change in an appearance caused by a color temperature; and
a color matrix section which, based on the 9 correction color matrix coefficient, performs a color adjustment on the color image signal obtained by the automatic white balance process, wherein the color matrix coefficient generation asection gradually changes 4 correction color matrix coefficients included in the 3×3 matrix, the image data to be processed is data relating to red, green, and blue, the 4 correction color matrix coefficients comprise a first correction color matrix coefficient and a second correction color matrix coefficient, and the color matrix generation section determines the first correction color matrix coefficient by determining a product of a first function having a ratio of a red gain value to a blue gain value as a parameter of the first function and a preset color coefficient for red, and determines the second correction color matrix coefficient by determining a product of a second function having the ratio as a parameter of the second function and a preset color coefficient for blue.

6. The image sensor according to claim 5,
wherein the first and second functions are determined which are required to convert the preset color matrix coefficients into predetermined appropriate color matrix coefficients for appropriate correction corresponding to the plurality of gain value ratios.

7. The image sensor according to claim 5, further comprising a color temperature estimation section which estimates a color temperature based on the gain value acquired by the gain acquisition section, and based on the color temperature estimated by the color temperature estimation section, the color matrix coefficient generation section determines the 3×3 matrix having the property of correcting the change in appearance caused by the estimated color temperature.

8. The image sensor according to claim 5, wherein the color matrix coefficient generation section determines the 4 correction color matrix coefficient based on function expressions to determine the 4 correction color matrix coefficients based on gain value parameters and the gain value acquired by the gain value acquisition section.

9. An image processing method comprising:
acquiring a gain value obtained by an automatic white balance process executed on image data to be processed;
determining a 3×3 matrix including 9 correction color matrix coefficients having a property of correcting a change in an appearance caused by a color temperature corresponding to the gain value based on the gain value; and
performing a color adjustment on the image data subjected to the automatic white balance process based on the 9 correction color matrix coefficient,
wherein the determining comprises gradually changing 4 correction color matrix coefficients included in the 3×3 matrix,
the image data to be processed is data relating to red, green, and blue, the 4 correction color matrix coefficients comprises a first correction color matrix coefficient and the second correction color matrix coefficient, and
the determining includes determining the first correction color matrix coefficient by determining a product of a first function having a ratio of a red gain value to a blue gain value as a parameter of the first function and a preset color coefficient for red, and determining a second correction color matrix coefficient by determining the product of a second function having the ratio as a parameter of the second function and a preset color coefficient for blue.

10. The image processing device according to claim 1, wherein
- in an environment exhibiting a lower color temperature than a place under a standard light source, the red gain value is reduced and the blue gain value is increased to adjust an inclination of a spectral distribution, and
- in an environment exhibiting a higher color temperature than the place under the standard light source, the blue gain value is reduced and the red gain value is increased to adjust the inclination of the spectral distribution.

11. The image sensor according to claim 5, wherein
- in an environment exhibiting a lower color temperature than a place under a standard light source, the red gain value is reduced and the blue gain value is increased to adjust an inclination of a spectral distribution, and
- in an environment exhibiting a higher color temperature than the place under the standard light source, the blue gain value is reduced and the red gain value is increased to adjust the inclination of the spectral distribution.

12. The image processing method according to claim 9, wherein
- in an environment exhibiting a lower color temperature than a place under a standard light source, the red gain value is reduced and the blue gain value is increased to adjust an inclination of a spectral distribution, and
- in an environment exhibiting a higher color temperature than the place under the standard light source, the blue gain value is reduced and the red gain value is increased to adjust the inclination of the spectral distribution.

13. The image processing device according to claim 1, wherein
- the preset color coefficient for red denotes $A_{11}$,
- the ratio of the red gain value to the blue gain value denotes B/R,
- the first function denotes $g_{11}(B/R)$,
- the first correction matrix coefficient denotes $g_{11}(B/R) \cdot A_{11}$,
- the preset color coefficient for blue denotes $A_{31}$,
- the second function denotes $g_{31}(B/R)$, and
- the second correction matrix coefficient denotes $g_{31}(B/R) \cdot A_{31}$.

14. The image sensor according to claim 5, wherein
- the preset color coefficient for red denotes $A_{11}$,
- the ratio of the red gain value to the blue gain value denotes B/R,
- the first function denotes $g_{11}(B/R)$,
- the first correction matrix coefficient denotes $g_{11}(B/R) \cdot A_{11}$,
- the preset color coefficient for blue denotes $A_{31}$,
- the second function denotes $g_{31}(B/R)$, and
- the second correction matrix coefficient denotes $g_{31}(B/R) \cdot A_{31}$.

15. The image processing method according to claim 9, wherein
- the preset color coefficient for red denotes $A_{11}$,
- the ratio of the red gain value to the blue gain value denotes B/R,
- the first function denotes $g_{11}(B/R)$,
- the first correction matrix coefficient denotes $g_{11}(B/R) \cdot A_{11}$,
- the preset color coefficient for blue denotes $A_{31}$,
- the second function denotes $g_{31}(B/R)$, and
- the second correction matrix coefficient denotes $g_{31}(B/R) \cdot A_{31}$.

\* \* \* \* \*